United States Patent Office 2,732,365
Patented Jan. 24, 1956

2,732,365

RUBBERY CONJUGATED DIENE POLYMERS STABILIZED WITH MONOARYL PHOSPHITES

John C. Bill, Naugatuck, and Byron A. Hunter, Seymour, Conn., assignors to United States Rubber Company, New York, N. Y., a corporation of New Jersey No Drawing. Application September 4, 1952,
Serial No. 307,928

5 Claims. (Cl. 260—45.7)

This invention relates to a new class of compounds which have been discovered to have outstanding properties in the stabliziation of synthetic rubbery conjugated diene polymerizates such as GR–S, against heat deterioration and light, as well as a lessened tendency to hydrolyze in an aqueous system. Such useful combined features are not possessed by the organic phosphites as a class.

It has been found that the mono(alkylaryl)phosphites in which the alkyl group has at least four carbon atoms are excellent GR–S stabilizers possessing sufficient resistance to hydrolysis so that they can be added to the GR–S at the latex stage, prior to coagulation, without danger of decomposition. The lower alkyl (below four carbons) substituted mono aryl phosphites as well as the unsubstituted mono phenyl phosphites are not sufficiently resistant to hydrolysis to permit addition to the GR–S latex. In addition, the compounds of this invention are superior to the triaryl phosphites as light stabilizing compounds.

The present compounds subscribe to the general formula

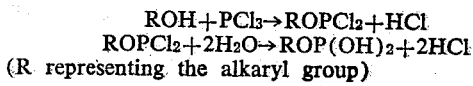

in which R is an alkyl group of at least four carbon atoms. The aromatic nucleus may contain additional substituents, but it should contain at least one alkyl group of at least four carbon atoms.

Exemplary of such compounds are:

| | Neutral Equivalent (N. E.) [1] | | P Anal. (Percent) | | $n_D^{20}$ |
|---|---|---|---|---|---|
| | Calcd. | Found | Calcd. | Found | |
| Mono(o-sec. amyl phenyl) phosphite | 228 | 232 | 13.6 | 13.8 | 1.5110 |
| Mono(p-1,1,3,3-tetramethyl butyl phenyl) phosphite | 270 | 277 | 11.5 | 11.7 | 1.5086 |
| Mono(2,4-disec.amyl phenyl) phosphite | 299 | 313 | 10.3 | 10.4 | 1.4983 |
| Mono(2-tert. butyl-5-methyl phenyl) phosphite | 228 | 228 | 13.6 | 14.2 | solid |
| Mono(2,4-ditert.butyl-5-methyl phenyl) phosphite | 284 | 284 | 10.9 | 11.6 | solid |

Compounds which are mixtures of isomers:

| | Neutral Equivalent (N. E.) [1] | | P. Anal. Percent | | $n_D^{20}$ |
|---|---|---|---|---|---|
| | Calcd. | Found | Calcd. | Found | |
| Mono(nonyl phenyl) phosphite | 287 | 285 | 10.9 | 10.8 | 1.5139 |
| Mono(dodecylphenyl) phosphite | 326 | 331 | 9.5 | 9.8 | 1.5020 |
| Mono(dinonyl phenyl) | 410 | 427 | 7.5 | 7.1 | 1.5123 |

[1] Neutral equivalent: Molecular weight as determined by a neutralization titration.

Other compounds which fall into this class are:

Mono(p-tert.amyl phenyl) phosphite
Mono(n-hexyl phenyl) phosphite
Mono(n-heptyl phenyl) phosphite
Mono(p-n-decyl phenyl) phosphite
Mono(p-n-pentadecyl phenyl) phosphite
Mono(p-n-hexadecyl phenyl) phosphite
Mono(p-n-octadecyl phenyl) phosphite The present phosphites may be made by the procedure of reacting a proper alkyl-substituted phenol with an excess of phosphorus trichloride such as three mols phosphorus trichloride per mol phenol, removing the excess phosphorus trichloride, and then hydrolyzing the intermediate alkyl-phenoxy phosphorus dichloride.

$$ROH + PCl_3 \rightarrow ROPCl_2 + HCl$$
$$ROPCl_2 + 2H_2O \rightarrow ROP(OH)_2 + 2HCl$$

(R representing the alkaryl group)

To assure a high yield of mono alkaryloxy phosphorus dichloride at least one mol of phosphorus trichloride should be used per mol of phenol. Preferably an excess of phosphorus trichloride even to a ratio of 3 mols phosphorus trichloride per mol phenol can be used. The excess phosphorus trichloride along with any hydrogen chloride is removed by fractional distillation. The intermediate alkylated phenoxy phosphorus dichloride is purified by fractional distillation and then hydrolyzed with a theoretical amount of water to the mono(alkylaryl) phosphite.

Except for removal of unreacted phosphorus trichloride and removal of or neutralization of formed hydrogen chloride, the crude product of reaction can itself be subjected to hydrolysis with water to form the mono(alkylaryl) phosphite and after removal of any free hydrogen chloride therefrom can, because of its major proportion of the mono(alkylaryl) phosphite, be used in crude form (without isolation of said phosphite) for stabilizing the synthetic rubber.

The following examples illustrate the invention:

Example 1.—Mono(o-sec.amyl phenyl)phosphite o-Sec.amyl phenol (200 g., 1.19 mol) was added, with stirring and heating, to phosphorus trichloride (163.5 g., 1.19 mol). After the addition of all of the phenol, the heating (80°–90° C.) and stirring were continued for fourteen hours. Carbon dioxide was then bubbled through and the resulting material was fractionally distilled under vacuum and under nitrogen.

| | G. |
|---|---|
| 1st fract., up to 106° C., 2.3 mm | 5 |
| 2nd fract., 100–101° C., 1.5 mm | 86.5 |
| 3rd fract., 96– 97° C., 1.1 mm | 27.5 |
| 4th fract., 97–146° C., 1.1 mm | 5 |
| 5th fract., 175–180° C., 3 mm | 52 |
| Residue | 110 |

Fract. 2 (40 g., .151 mol), mono(o-sec.amyl phenoxy) phosphorus dichloride was treated with water (5.50 g., 1305 mol) with cooling and stirring. Carbon dioxide was then bubbled through the remaining oil. The excess water (.003 mol) was removed by allowing the oil to stand in a vacuum desiccator over phosphorus pentoxide for forty-eight hours. Mono(o-sec.amyl phenyl)phosphite was obtained as a thick oil with a refractive index ($n_D^{20}$) of 1.5110.

*Anal.*—Calcd. for $C_{11}H_{17}O_3P$: per cent P, 13.6; N. E. 228. Found: per cent P, 13.8; N. E. 232.

Example 2.—Mono(nonylphenyl) phosphite

Nonyl phenol (1102 g., 5 mol) prepared from nonene and phenol and consisting of ortho and para nonyl phenols was added dropwise to phosphorus trichloride (2400 g., 17.5 mol) contained in a 5-liter 3-necked flask equipped with reflux condenser, pot thermometer, glycerine-sealed stirrer and dropping funnel. The stirring was continued for three hours and the reaction flask allowed to stand over the week-end. The excess phosphorus trichloride was then distilled off at atmospheric pressure, the last traces being removed under water-aspirator vacuum and under nitrogen. The residue was then distilled under oil pump vacuum under nitrogen.

|  | G. |
|---|---|
| 1st fract., 91–148° C., 1.3–1.8 mm | ⎱ |
| 2nd fract., 139–139.2° C., 1.3 mm | ⎰ 1092 (77%) |
| 3rd fract., 148–156° C., 1.8–2.3 mm | |
| 4th fract., 149–151° C., .7 mm | 18.7 |
| 5th fract., 151–179° C., .7–.8 mm | 149.5 |
| 6th fract., 179–220° C., .8 mm | 61.6 |

Fraction 2 (51 g., .159 mol) mono(nonyl phenoxy) phosphorus dichloride was treated, with stirring and cooling, with water (5.72 g.; .318 mol). Carbon dioxide was then bubbled through the liquid and the sample placed in a vacuum desiccator for fourteen hours. There remained mono(nonyl phenyl) phosphite a clear, viscous liquid with a refractive index ($n_D^{20}$) of 1.514.

*Anal.*—Calcd. for $C_{15}H_{25}O_3P$: percent P, 10.9; N. E. 284. Found: percent P, 10.8; N. E. 285.

Example 3.—Mono(dinonyl phenyl) phosphite

Dinonyl phenol (344 g., .998 mol) prepared from nonene and phenol and consisting largely of ortho, para dinonyl phenol was added dropwise to phosphorus trichloride (550 g., 4.01 mol) contained in a three-necked flask equipped with a reflux condenser and hydrogen chloride trap, glycerine-sealed stirrer, pot thermometer and dropping funnel. The reaction went with no external heating and the reaction flask was allowed to stand fifty-four hours. The excess phosphorus trichloride was removed by distillation at atmospheric pressure, the last portion being removed by distillation under water-aspirator vacuum under nitrogen.

|  | G. |
|---|---|
| 1st fract., up to 157° C., .5 mm | 38 |
| 2nd fract., 157–157.5° C., .5 mm | 62 |
| 3rd fract., 157.5–160° C., .5–.7 mm | 110 |
| 4th fract., 160–170° C., .7 mm | 20 |
| 5th fract., 170–175° C., .7–.6 mm | 16 |

Fraction 2 and fraction 3 are substantially the same product but fraction 2 was chosen because it was believed to be the better product as shown by the narrowness of the distillation range. Fraction 2 (60 g., 134 mol) and treated with water (4.84 cc., .268 mol), with stirring and cooling. The remaining oil was stirred for three hours, carbon dioxide bubbled through and dried in a vacuum desiccator over phosphorus pentoxide. Mono(dinonyl phenyl) phosphite was a clear viscous oil with a refractive index ($n_D^{20}$) of 1.512.

*Anal.*—Calcd. for $C_{24}H_{43}O_3P$: percent P, 7.5; N. E., 410. Found: percent P, 7.1; N. E., 427.

Example 4.—Mono(2,4-ditert.butyl-5-methyl phenyl) phosphite 2,4-ditert.butyl-5-methyl phenol (203 g., .922 mol) was treated with phosphorus trichloride (320 g., 2.34 mol) in a three-necked flask equipped with reflux condenser and hydrogen chloride trap, pot thermometer, glycerine-sealed stirrer and addition funnel. No reaction started at room temperature but on heating (80°–90° C.) and stirring, hydrogen chloride came off in great quantities. After heating and stirring for fourteen hours the excess phosphorus trichloride was distilled off, the major portion at atmospheric pressure and the last traces under water-aspirator vacuum under nitrogen. The remaining liquid was then distilled under oil pump vacuum under nitrogen.

|  | G. |
|---|---|
| Fore run, up to 126° C., 1.5 mm | 35 |
| Main fract., 126–132° C., 1.5–2.0 mm | 219 |
| Residue | 30 |

The main fraction (50 g., 156 mol) was treated with water (5.62 g., .312 mol), with cooling and stirring. Mono(2,4-ditert.butyl-5-methyl phenyl) phosphite was obtained as a white crystalline solid (M. P. 117–118° C.).

*Anal.*—Calcd. for $C_{15}H_{25}O_3P$: percent P, 10.9; N. E., 284. Found: percent P, 11.6; N. E., 284.

The said esters of phosphorus acid protect GR–S rubber against heat treatment, as shown, by submitting them to the resinification test. In this test the stabilizers are incorporated into the latex, the latex flocculated, washed, dried overnight at 80° C., milled, and the resulting polymer submitted to a temperature of 130° C. until definite resinification has occurred. The time required for resinification is then noted.

| Compounds tested | Resinification time at 130° C. (Hours) |
|---|---|
| Mono(2-sec. amyl phenyl) phosphite | 3.5 |
| Mono(4-1,1,3,3-tetra methyl butyl phenyl) | 3.5 |
| Mono(nonyl phenyl) phosphite | 9.0 |
| Mono(dodecyl phenyl) phosphite | 8.0 |
| Mono(di-sec. amyl phenyl) phosphite | 11.0 |
| Mono(di-nonyl phenyl) phosphite | 11.0 |
| Mono(2-tert. butyl 4-methyl phenyl) phosphite | 3.0 |
| Mono(2,4-ditert. butyl-5-methyl phenyl) phosphite | 7.0 |
| Control | 1.0 |

The failure of mono(phenyl) phosphite, due to the rate of hydrolysis, was shown by heating the synthetic rubber latex, containing mono(phenyl) phosphite at 60° C., removing samples at intervals, flocculating these by salt-acid technique, washing, drying, milling and comparing the resinification times at 130° C. For comparison, the same procedure was followed with 1.5 parts mono(nonyl phenyl) phosphite per 100 rubber hydrocarbon.

| Heating—Hours at 60° C. | Resinification Time (Hrs.) at 130° C. | |
|---|---|---|
|  | A | B |
| 0 | 9 | 3½ |
| 18 | 14 | 3½ |
| 25 | 13 | 3 |
| 42 | 5½ | 1 |
| 49 | 8 | 1½ |

A = Mono(nonyl phenyl) phosphite
B = Mono(phenyl) phosphite

From these results it is obvious that mono(phenyl) phosphite has little stabilizing power in the latex at 60° C., whereas mono(nonyl phenyl) phosphite definitely and clearly substantially protects the GR–S against heat.

In addition to stabilizing GR–S against heat, these compounds are also superior as stabilizers against light as shown by the following:

Samples of synthetic rubber (GR–S) in which were incorporated 1.5 parts phosphite stabilizer per 100 parts rubber as already described were exposed to sunlight for a time necessary to cause resinification as evidenced by a surface crusting. Stocks containing the compounds of this invention remained soft and pliable while the stocks containing triaryl phosphites were unsuitable for use.

| | Resinification time, weeks |
|---|---|
| Control | 1 |
| Tri(nonyl phenyl) phosphite | 1 |
| Mono(nonyl phenyl) phosphite | 3 |
| Mono(dinonyl phenyl) phosphite | 3 |
| Mono(2,4-ditert.butyl-5-methyl phenyl) phosphite | 4 |

While the invention has been described with particular reference to the copolymer of butadiene and styrene it is also applicable to the copolymers of butadiene with acrylonitrile, vinylpyridine, methyl acrylate or methyl methacrylate.

Finished rubber stocks made from the vulcanization of these phosphite stabilized rubbers are satisfactory with respect to the usual physical properties such as tensile, flexibility, abrasion resistance etc.

Having thus described our invention, what we claim and desire to protect by Letters Patent is:

1. A rubbery conjugated diene polymerizate stabilized with a small stabilizing proportion of a monoaryl phosphite of the formula Aryl—O—P—(OH)$_2$ in which Aryl is a benzene nucleus which is directly linked to at least one alkyl substituent having at least four carbon atoms.

2. A rubbery butadiene-styrene polymerizate stabilized with a small stabilizing proportion of a monoaryl phosphite of the formula Aryl—O—P—(OH)$_2$ in which Aryl is a benzene nucleus which is directly linked to at least one alkyl substituent having at least four carbon atoms.

3. A rubbery butadiene-styrene polymerizate stabilized with a small stabilizing proportion of mono(nonylphenyl)phosphite.

4. A rubber butadiene-styrene polymerizate stabilized with a small stabilizing proportion of mono(dodecylphenyl)phosphite.

5. A rubbery butadiene-styrene polymerizate stabilized with a small stabilizing proportion of mono(di-tertiary-butyl meta-cresyl)phosphite.

References Cited in the file of this patent

UNITED STATES PATENTS

| | | |
|---|---|---|
| 2,419,354 | Howland et al. | Apr. 22, 1947 |
| 2,508,430 | Smith et al. | May 23, 1950 |